US011035207B2

(12) United States Patent
Oehring et al.

(10) Patent No.: US 11,035,207 B2
(45) Date of Patent: Jun. 15, 2021

(54) HYBRID HYDRAULIC FRACTURING FLEET

(71) Applicant: U.S. Well Services, Inc., Houston, TX (US)

(72) Inventors: Jared Oehring, Houston, TX (US); Brandon Neil Hinderliter, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 0 days.

(21) Appl. No.: 16/385,070

(22) Filed: Apr. 16, 2019

(65) Prior Publication Data

US 2019/0316447 A1  Oct. 17, 2019

Related U.S. Application Data

(60) Provisional application No. 62/658,257, filed on Apr. 16, 2018.

(51) Int. Cl.
*E21B 43/26* (2006.01)
*E21B 41/00* (2006.01)
(Continued)

(52) U.S. Cl.
CPC ........ *E21B 41/0085* (2013.01); *B60W 10/105* (2013.01); *E21B 43/2401* (2013.01); (Continued)

(58) Field of Classification Search
CPC ..................................................... E21B 43/26
See application file for complete search history.

(56) References Cited

U.S. PATENT DOCUMENTS 1,656,861 A    1/1928   Leonard
1,671,436 A    5/1928   Melott
(Continued)

FOREIGN PATENT DOCUMENTS

AU    2007340913    7/2008
CA       2406801    11/2001
(Continued)

OTHER PUBLICATIONS

International Search Report and Written Opinion dated Apr. 10, 2019 in corresponding PCT Application No. PCT/US2019/016635.
(Continued)

*Primary Examiner* — Kenneth L Thompson
(74) *Attorney, Agent, or Firm* — Hogan Lovells US LLP

(57) ABSTRACT

A hydraulic fracturing system is disclosed as including a singular mobile platform of at least one mobile power unit (MPU) and at least one first switch gear that is configured to handle electric power from the MPU. The MPU is configured to generate voltage that matches the requirements of an electrical bus from the at least one switch gear such that a combined electrical current generated as a result of the generated voltage is provided to the electrical bus to the components of the hydraulic fracturing system. Further, the hydraulic fracturing system may include electrical fracturing equipment with at least one second switch gear to support the at least one first switch gear in handling electric power from the MPU. A datavan may be included in the system to control load shedding, load sharing, and power distribution for the electrical fracturing equipment comprising the at least one second switch gear.

18 Claims, 4 Drawing Sheets

(51) Int. Cl.
  *B60W 10/105* (2012.01)
  *E21B 43/24* (2006.01)
  *F04B 17/03* (2006.01)
  *F04B 49/06* (2006.01)

(52) U.S. Cl.
  CPC .............. *E21B 43/26* (2013.01); *F04B 17/03* (2013.01); *F04B 49/065* (2013.01)

(56) References Cited

U.S. PATENT DOCUMENTS

| | | |
|---|---|---|
| 2,004,077 A | 6/1935 | McCartney |
| 2,183,364 A | 12/1939 | Bailey |
| 2,220,622 A | 11/1940 | Aitken |
| 2,248,051 A | 7/1941 | Armstrong |
| 2,407,796 A | 9/1946 | Page |
| 2,416,848 A | 3/1947 | Rothery |
| 2,610,741 A | 9/1952 | Schmid |
| 2,753,940 A | 7/1956 | Bonner |
| 3,055,682 A | 9/1962 | Bacher |
| 3,061,039 A | 10/1962 | Peters |
| 3,066,503 A | 12/1962 | Fleming |
| 3,302,069 A | 1/1967 | Webster |
| 3,334,495 A | 8/1967 | Jensen |
| 3,722,595 A | 3/1973 | Kiel |
| 3,764,233 A | 10/1973 | Strickland |
| 3,773,140 A | 11/1973 | Mahajan |
| 3,837,179 A | 9/1974 | Barth |
| 3,849,662 A | 11/1974 | Blaskowski |
| 3,878,884 A | 4/1975 | Raleigh |
| 3,881,551 A | 5/1975 | Terry |
| 4,037,431 A | 7/1977 | Sugimoto |
| 4,100,822 A | 7/1978 | Rosman |
| 4,151,575 A | 4/1979 | Hogue |
| 4,226,299 A | 10/1980 | Hansen |
| 4,265,266 A | 5/1981 | Kierbow et al. |
| 4,432,064 A | 2/1984 | Barker |
| 4,442,665 A | 4/1984 | Fick et al. |
| 4,456,092 A | 6/1984 | Kubozuka |
| 4,506,982 A | 3/1985 | Smithers et al. |
| 4,512,387 A | 4/1985 | Rodriguez |
| 4,529,887 A | 7/1985 | Johnson |
| 4,538,916 A | 9/1985 | Zimmerman |
| 4,676,063 A | 6/1987 | Goebel et al. |
| 4,759,674 A | 7/1988 | Schroder |
| 4,793,386 A | 12/1988 | Sloan |
| 4,845,981 A | 7/1989 | Pearson |
| 4,922,463 A | 5/1990 | Del Zotto et al. |
| 5,004,400 A | 4/1991 | Handke |
| 5,006,044 A | 4/1991 | Walker, Sr. |
| 5,025,861 A | 6/1991 | Huber |
| 5,050,673 A | 9/1991 | Baldridge |
| 5,130,628 A | 7/1992 | Owen |
| 5,131,472 A | 7/1992 | Dees et al. |
| 5,172,009 A | 12/1992 | Mohan |
| 5,189,388 A | 2/1993 | Mosley |
| 5,230,366 A | 7/1993 | Marandi |
| 5,366,324 A | 11/1994 | Arlt |
| 5,422,550 A | 6/1995 | McClanahan |
| 5,433,243 A | 7/1995 | Griswold |
| 5,439,066 A | 8/1995 | Gipson |
| 5,517,822 A | 5/1996 | Haws et al. |
| 5,548,093 A | 8/1996 | Sato |
| 5,590,976 A | 1/1997 | Kilheffer et al. |
| 5,655,361 A | 8/1997 | Kishi |
| 5,736,838 A | 4/1998 | Dove et al. |
| 5,755,096 A | 5/1998 | Holleyman |
| 5,790,972 A | 8/1998 | Kohlenberger |
| 5,865,247 A | 2/1999 | Paterson |
| 5,879,137 A | 3/1999 | Yie |
| 5,894,888 A | 4/1999 | Wiemers |
| 5,907,970 A | 6/1999 | Havlovick et al. |
| 6,007,227 A * | 12/1999 | Carlson ................ E21B 43/267 700/239 |
| 6,138,764 A | 10/2000 | Scarsdale et al. |
| 6,142,878 A | 11/2000 | Barin |
| 6,164,910 A | 12/2000 | Mayleben |
| 6,202,702 B1 | 3/2001 | Ohira |
| 6,208,098 B1 | 3/2001 | Kume |
| 6,254,462 B1 | 7/2001 | Kelton |
| 6,271,637 B1 | 8/2001 | Kushion |
| 6,273,193 B1 | 8/2001 | Hermann |
| 6,315,523 B1 | 11/2001 | Mills |
| 6,477,852 B2 | 11/2002 | Dodo |
| 6,484,490 B1 | 11/2002 | Olsen |
| 6,491,098 B1 | 12/2002 | Dallas |
| 6,529,135 B1 | 3/2003 | Bowers et al. |
| 6,626,646 B2 | 9/2003 | Rajewski |
| 6,719,900 B2 | 4/2004 | Hawkins |
| 6,765,304 B2 | 7/2004 | Baten et al. |
| 6,776,227 B2 | 8/2004 | Beida |
| 6,802,690 B2 | 10/2004 | Han |
| 6,808,303 B2 | 10/2004 | Fisher |
| 6,931,310 B2 | 8/2005 | Shimizu et al. |
| 6,936,947 B1 | 8/2005 | Leijon |
| 6,985,750 B1 | 1/2006 | Vicknair et al. |
| 7,082,993 B2 | 8/2006 | Ayoub |
| 7,104,233 B2 | 9/2006 | Ryczek et al. |
| 7,170,262 B2 | 1/2007 | Pettigrew |
| 7,173,399 B2 | 2/2007 | Sihler |
| 7,308,933 B1 | 12/2007 | Mayfield |
| 7,312,593 B1 | 12/2007 | Streicher et al. |
| 7,336,514 B2 | 2/2008 | Amarillas |
| 7,445,041 B2 | 11/2008 | O'Brien |
| 7,494,263 B2 | 2/2009 | Dykstra et al. |
| 7,500,642 B2 | 3/2009 | Cunningham |
| 7,525,264 B2 | 4/2009 | Dodge |
| 7,563,076 B2 | 7/2009 | Brunet |
| 7,581,379 B2 | 9/2009 | Yoshida |
| 7,675,189 B2 | 3/2010 | Grenier |
| 7,683,499 B2 | 3/2010 | Saucier |
| 7,717,193 B2 | 5/2010 | Egilsson et al. |
| 7,755,310 B2 | 7/2010 | West et al. |
| 7,807,048 B2 | 10/2010 | Collette |
| 7,835,140 B2 | 11/2010 | Mori |
| 7,845,413 B2 | 12/2010 | Shampine et al. |
| 7,926,562 B2 | 4/2011 | Poitzsch |
| 7,894,757 B2 | 7/2011 | Keast |
| 7,977,824 B2 | 7/2011 | Halen et al. |
| 8,037,936 B2 | 10/2011 | Neuroth |
| 8,054,084 B2 | 11/2011 | Schulz et al. |
| 8,083,504 B2 | 12/2011 | Williams |
| 8,091,928 B2 | 1/2012 | Carrier |
| 8,096,354 B2 | 1/2012 | Poitzsch |
| 8,096,891 B2 | 1/2012 | Lochtefeld |
| 8,139,383 B2 | 3/2012 | Efraimsson |
| 8,146,665 B2 | 4/2012 | Neal |
| 8,154,419 B2 | 4/2012 | Daussin et al. |
| 8,232,892 B2 | 7/2012 | Overholt et al. |
| 8,261,528 B2 | 9/2012 | Chillar |
| 8,272,439 B2 | 9/2012 | Strickland |
| 8,310,272 B2 | 11/2012 | Quarto |
| 8,354,817 B2 | 1/2013 | Yeh et al. |
| 8,474,521 B2 | 7/2013 | Kajaria |
| 8,506,267 B2 | 8/2013 | Gambier et al. |
| 8,534,235 B2 | 9/2013 | Chandler |
| 8,573,303 B2 | 11/2013 | Kerfoot |
| 8,596,056 B2 | 12/2013 | Woodmansee |
| 8,616,005 B1 | 12/2013 | Cousino |
| 8,616,274 B2 | 12/2013 | Belcher et al. |
| 8,646,521 B2 | 2/2014 | Bowen |
| 8,692,408 B2 | 4/2014 | Zhang et al. |
| 8,727,068 B2 | 5/2014 | Bruin |
| 8,760,657 B2 | 6/2014 | Pope |
| 8,763,387 B2 | 7/2014 | Schmidt |
| 8,774,972 B2 | 7/2014 | Rusnak |
| 8,789,601 B2 | 7/2014 | Broussard |
| 8,795,525 B2 | 8/2014 | McGinnis et al. |
| 8,800,652 B2 | 8/2014 | Bartko |
| 8,807,960 B2 | 8/2014 | Stephenson |
| 8,838,341 B2 | 9/2014 | Kumano |
| 8,851,860 B1 | 10/2014 | Mail |
| 8,857,506 B2 | 10/2014 | Stone, Jr. |
| 8,899,940 B2 | 12/2014 | Laugemors |

(56) References Cited

U.S. PATENT DOCUMENTS

| | | |
|---|---|---|
| 8,905,056 B2 | 12/2014 | Kendrick |
| 8,905,138 B2 | 12/2014 | Lundstedt et al. |
| 8,997,904 B2 | 4/2015 | Cryer |
| 9,018,881 B2 | 4/2015 | Mao et al. |
| 9,051,822 B2 | 6/2015 | Ayan |
| 9,051,923 B2 | 6/2015 | Kuo |
| 9,061,223 B2 | 6/2015 | Winborn |
| 9,062,545 B2 | 6/2015 | Roberts et al. |
| 9,067,182 B2 | 6/2015 | Nichols |
| 9,103,193 B2 | 8/2015 | Coli |
| 9,119,326 B2 | 8/2015 | McDonnell |
| 9,121,257 B2 | 9/2015 | Coli et al. |
| 9,140,110 B2 | 9/2015 | Coli et al. |
| 9,160,168 B2 | 10/2015 | Chapel |
| 9,175,554 B1 | 11/2015 | Watson |
| 9,206,684 B2 | 12/2015 | Parra |
| 9,260,253 B2 | 2/2016 | Naizer |
| 9,322,239 B2 | 4/2016 | Angeles Boza et al. |
| 9,324,049 B2 * | 4/2016 | Thomeer ............ E21B 41/0092 |
| 9,340,353 B2 | 5/2016 | Oren |
| 9,366,114 B2 | 6/2016 | Coli et al. |
| 9,410,410 B2 | 8/2016 | Broussard et al. |
| 9,450,385 B2 | 9/2016 | Kristensen |
| 9,458,687 B2 | 10/2016 | Hallundbaek |
| 9,475,020 B2 | 10/2016 | Coli et al. |
| 9,475,021 B2 | 10/2016 | Coli et al. |
| 9,482,086 B2 | 11/2016 | Richardson et al. |
| 9,499,335 B2 | 11/2016 | McIver |
| 9,506,333 B2 | 11/2016 | Castillo et al. |
| 9,513,055 B1 | 12/2016 | Seal |
| 9,534,473 B2 | 1/2017 | Morris et al. |
| 9,562,420 B2 | 2/2017 | Morris et al. |
| 9,587,649 B2 | 3/2017 | Oehring |
| 9,611,728 B2 | 4/2017 | Oehring |
| 9,650,871 B2 | 5/2017 | Oehring et al. |
| 9,650,879 B2 | 5/2017 | Broussard et al. |
| 9,706,185 B2 | 7/2017 | Ellis |
| 9,728,354 B2 | 8/2017 | Skolozdra |
| 9,738,461 B2 | 8/2017 | DeGaray |
| 9,739,546 B2 | 8/2017 | Bertilsson et al. |
| 9,745,840 B2 | 8/2017 | Oehring et al. |
| 9,840,901 B2 | 12/2017 | Oehring et al. |
| 9,863,228 B2 | 1/2018 | Shampine et al. |
| 9,893,500 B2 | 2/2018 | Oehring |
| 9,909,398 B2 | 3/2018 | Pham |
| 9,915,128 B2 | 3/2018 | Hunter |
| 9,932,799 B2 | 4/2018 | Symchuk |
| 9,963,961 B2 | 5/2018 | Hardin |
| 9,970,278 B2 | 5/2018 | Broussard |
| 9,976,351 B2 | 5/2018 | Randall |
| 9,995,218 B2 | 6/2018 | Oehring |
| 10,008,880 B2 * | 6/2018 | Vicknair .................. H02J 3/14 |
| 10,020,711 B2 | 7/2018 | Oehring |
| 10,036,238 B2 | 7/2018 | Oehring |
| 10,107,086 B2 | 10/2018 | Oehring |
| 10,119,381 B2 | 11/2018 | Oehring |
| 10,184,465 B2 | 1/2019 | Enis et al. |
| 10,196,878 B2 | 2/2019 | Hunter |
| 10,221,639 B2 | 3/2019 | Romer et al. |
| 10,227,854 B2 | 3/2019 | Glass |
| 10,232,332 B2 | 3/2019 | Oehring |
| 10,246,984 B2 | 4/2019 | Payne |
| 10,254,732 B2 | 4/2019 | Oehring |
| 10,260,327 B2 | 4/2019 | Kajaria |
| 10,280,724 B2 | 5/2019 | Hinderliter |
| 10,287,873 B2 | 5/2019 | Filas |
| 10,302,079 B2 | 5/2019 | Kendrick |
| 10,309,205 B2 | 6/2019 | Randall |
| 10,337,308 B2 | 7/2019 | Broussard |
| 10,371,012 B2 | 8/2019 | Davis |
| 10,378,326 B2 | 8/2019 | Morris |
| 10,393,108 B2 | 8/2019 | Chong |
| 10,407,990 B2 | 9/2019 | Oehring |
| 10,408,030 B2 | 9/2019 | Oehring et al. |
| 10,408,031 B2 | 9/2019 | Oehring et al. |
| 10,415,332 B2 | 9/2019 | Morris |
| 10,436,026 B2 | 10/2019 | Ounadjela |
| 10,627,003 B2 | 4/2020 | Dale et al. |
| 10,669,471 B2 | 6/2020 | Schmidt et al. |
| 10,669,804 B2 | 6/2020 | Kotrla |
| 10,695,950 B2 | 6/2020 | Igo et al. |
| 10,711,576 B2 | 7/2020 | Bishop |
| 10,740,730 B2 | 8/2020 | Altamirano et al. |
| 2002/0169523 A1 | 11/2002 | Ross et al. |
| 2003/0056514 A1 | 3/2003 | Lohn |
| 2003/0079875 A1 | 5/2003 | Weng |
| 2003/0138327 A1 | 7/2003 | Jones et al. |
| 2004/0040746 A1 | 3/2004 | Niedermayr et al. |
| 2004/0102109 A1 | 5/2004 | Cratty et al. |
| 2004/0167738 A1 | 8/2004 | Miller |
| 2005/0061548 A1 | 3/2005 | Hooper |
| 2005/0116541 A1 | 6/2005 | Seiver |
| 2005/0274508 A1 | 12/2005 | Folk |
| 2006/0052903 A1 | 3/2006 | Bassett |
| 2006/0065319 A1 | 3/2006 | Csitari |
| 2006/0260331 A1 | 11/2006 | Andreychuk |
| 2007/0131410 A1 | 6/2007 | Hill |
| 2007/0187163 A1 | 8/2007 | Cone |
| 2007/0201305 A1 | 8/2007 | Heilman et al. |
| 2007/0226089 A1 | 9/2007 | DeGaray et al. |
| 2007/0277982 A1 | 12/2007 | Shampine |
| 2007/0278140 A1 | 12/2007 | Mallet et al. |
| 2008/0017369 A1 | 1/2008 | Sarada |
| 2008/0041596 A1 | 2/2008 | Blount |
| 2008/0095644 A1 | 4/2008 | Mantei et al. |
| 2008/0112802 A1 | 5/2008 | Orlando |
| 2008/0137266 A1 | 6/2008 | Jensen |
| 2008/0208478 A1 | 8/2008 | Ella et al. |
| 2008/0217024 A1 | 9/2008 | Moore |
| 2008/0236818 A1 | 10/2008 | Dykstra |
| 2008/0264625 A1 | 10/2008 | Ochoa |
| 2008/0264640 A1 | 10/2008 | Eslinger |
| 2008/0264649 A1 | 10/2008 | Crawford |
| 2008/0277120 A1 | 11/2008 | Hickie |
| 2009/0045782 A1 | 2/2009 | Datta |
| 2009/0065299 A1 | 3/2009 | Vito |
| 2009/0078410 A1 | 3/2009 | Krenek et al. |
| 2009/0090504 A1 | 4/2009 | Weightman |
| 2009/0093317 A1 | 4/2009 | Kajiwara et al. |
| 2009/0095482 A1 | 4/2009 | Surjaatmadja |
| 2009/0145611 A1 | 6/2009 | Pallini, Jr. |
| 2009/0153354 A1 | 6/2009 | Daussin et al. |
| 2009/0188181 A1 | 7/2009 | Forbis |
| 2009/0200035 A1 | 8/2009 | Bjerkreim et al. |
| 2009/0260826 A1 | 10/2009 | Sherwood |
| 2009/0308602 A1 | 12/2009 | Bruins et al. |
| 2010/0000508 A1 | 1/2010 | Chandler |
| 2010/0019574 A1 | 1/2010 | Baldassarre et al. |
| 2010/0038907 A1 | 2/2010 | Hunt |
| 2010/0045109 A1 | 2/2010 | Arnold |
| 2010/0051272 A1 | 3/2010 | Loree et al. |
| 2010/0101785 A1 | 4/2010 | Khvoshchev |
| 2010/0132949 A1 | 6/2010 | DeFosse et al. |
| 2010/0146981 A1 | 6/2010 | Motakef |
| 2010/0172202 A1 | 7/2010 | Borgstadt |
| 2010/0200224 A1 | 8/2010 | Nguete |
| 2010/0250139 A1 | 9/2010 | Hobbs et al. |
| 2010/0293973 A1 | 11/2010 | Erickson |
| 2010/0303655 A1 | 12/2010 | Scekic |
| 2010/0322802 A1 | 12/2010 | Kugelev |
| 2011/0005757 A1 | 1/2011 | Hebert |
| 2011/0017468 A1 | 1/2011 | Birch et al. |
| 2011/0052423 A1 | 3/2011 | Gambier |
| 2011/0061855 A1 | 3/2011 | Case et al. |
| 2011/0085924 A1 | 4/2011 | Shampine |
| 2011/0110793 A1 | 5/2011 | Leugemors et al. |
| 2011/0166046 A1 | 7/2011 | Weaver |
| 2011/0247878 A1 | 10/2011 | Rasheed |
| 2011/0272158 A1 | 11/2011 | Neal |
| 2012/0018016 A1 | 1/2012 | Gibson |
| 2012/0049625 A1 | 3/2012 | Hopwood |
| 2012/0085541 A1 | 4/2012 | Love et al. |
| 2012/0127635 A1 | 5/2012 | Grindeland |
| 2012/0152716 A1 | 6/2012 | Kikukawa et al. |

(56) References Cited

U.S. PATENT DOCUMENTS

| | | |
|---|---|---|
| 2012/0205301 A1 | 8/2012 | McGuire et al. |
| 2012/0205400 A1 | 8/2012 | DeGaray et al. |
| 2012/0222865 A1 | 9/2012 | Larson |
| 2012/0232728 A1 | 9/2012 | Karimi et al. |
| 2012/0247783 A1 | 10/2012 | Berner, Jr. |
| 2012/0255734 A1 | 10/2012 | Coli et al. |
| 2013/0009469 A1 | 1/2013 | Gillett |
| 2013/0025706 A1 | 1/2013 | DeGaray et al. |
| 2013/0175038 A1 | 7/2013 | Conrad |
| 2013/0175039 A1 | 7/2013 | Guidry |
| 2013/0180722 A1 | 7/2013 | Olarte Caro |
| 2013/0189629 A1 | 7/2013 | Chandler |
| 2013/0199617 A1 | 8/2013 | DeGaray et al. |
| 2013/0233542 A1 | 9/2013 | Shampine |
| 2013/0255271 A1 | 10/2013 | Yu et al. |
| 2013/0284278 A1 | 10/2013 | Winborn |
| 2013/0284455 A1 | 10/2013 | Kajaria et al. |
| 2013/0299167 A1 | 11/2013 | Fordyce |
| 2013/0306322 A1 | 11/2013 | Sanborn |
| 2013/0317750 A1 | 11/2013 | Hunter |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0054965 A1 | 2/2014 | Jain |
| 2014/0060658 A1 | 3/2014 | Hains |
| 2014/0095114 A1 | 4/2014 | Thomeer |
| 2014/0096974 A1 | 4/2014 | Coli |
| 2014/0124162 A1 | 5/2014 | Leavitt |
| 2014/0138079 A1 | 5/2014 | Broussard |
| 2014/0174717 A1 | 6/2014 | Broussard et al. |
| 2014/0219824 A1 | 8/2014 | Burnette |
| 2014/0238683 A1 | 8/2014 | Korach |
| 2014/0246211 A1 | 9/2014 | Guidry et al. |
| 2014/0251623 A1 | 9/2014 | Lestz et al. |
| 2014/0255214 A1 | 9/2014 | Burnette |
| 2014/0277772 A1 | 9/2014 | Lopez |
| 2014/0290768 A1 | 10/2014 | Randle |
| 2014/0379300 A1 | 12/2014 | Devine |
| 2015/0027712 A1 | 1/2015 | Vicknair |
| 2015/0053426 A1 | 2/2015 | Smith |
| 2015/0068724 A1 | 3/2015 | Coli et al. |
| 2015/0068754 A1 | 3/2015 | Coli et al. |
| 2015/0075778 A1 | 3/2015 | Walters |
| 2015/0083426 A1 | 3/2015 | Lesko |
| 2015/0097504 A1 | 4/2015 | Lamascus |
| 2015/0114652 A1 | 4/2015 | Lestz |
| 2015/0136043 A1 | 5/2015 | Shaaban |
| 2015/0144336 A1 | 5/2015 | Hardin et al. |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211512 A1 | 7/2015 | Wiegman |
| 2015/0211524 A1 | 7/2015 | Broussard |
| 2015/0217672 A1 | 8/2015 | Shampine |
| 2015/0225113 A1 | 8/2015 | Lungu |
| 2015/0252661 A1 | 9/2015 | Glass |
| 2015/0273419 A1* | 10/2015 | Chong ............ B01F 13/0037 166/308.1 |
| 2015/0300145 A1 | 10/2015 | Coli et al. |
| 2015/0300336 A1 | 10/2015 | Hernandez et al. |
| 2015/0314225 A1 | 11/2015 | Coli et al. |
| 2015/0330172 A1 | 11/2015 | Allmaras |
| 2015/0354322 A1 | 12/2015 | Vicknair |
| 2016/0032703 A1 | 2/2016 | Broussard et al. |
| 2016/0102537 A1 | 4/2016 | Lopez |
| 2016/0105022 A1 | 4/2016 | Oehring |
| 2016/0160889 A1 | 6/2016 | Hoffman et al. |
| 2016/0177675 A1 | 6/2016 | Morris et al. |
| 2016/0177678 A1 | 6/2016 | Morris |
| 2016/0186531 A1 | 6/2016 | Harkless et al. |
| 2016/0208592 A1 | 7/2016 | Oehring |
| 2016/0208593 A1 | 7/2016 | Coli et al. |
| 2016/0208594 A1 | 7/2016 | Coli et al. |
| 2016/0208595 A1 | 7/2016 | Tang |
| 2016/0221220 A1 | 8/2016 | Paige |
| 2016/0230524 A1 | 8/2016 | Dumoit |
| 2016/0230525 A1 | 8/2016 | Lestz et al. |
| 2016/0258267 A1 | 9/2016 | Payne |
| 2016/0265457 A1 | 9/2016 | Stephenson |
| 2016/0273328 A1 | 9/2016 | Oehring |
| 2016/0273456 A1 | 9/2016 | Zhang et al. |
| 2016/0281484 A1 | 9/2016 | Lestz |
| 2016/0290114 A1 | 10/2016 | Oehring |
| 2016/0290563 A1 | 10/2016 | Diggins |
| 2016/0312108 A1 | 10/2016 | Lestz et al. |
| 2016/0319650 A1 | 11/2016 | Oehring |
| 2016/0326853 A1 | 11/2016 | Fred et al. |
| 2016/0326854 A1 | 11/2016 | Broussard |
| 2016/0326855 A1 | 11/2016 | Coli et al. |
| 2016/0341281 A1 | 11/2016 | Brunvold et al. |
| 2016/0348479 A1 | 12/2016 | Oehring |
| 2016/0349728 A1 | 12/2016 | Oehring |
| 2016/0369609 A1 | 12/2016 | Morris et al. |
| 2017/0016433 A1 | 1/2017 | Chong |
| 2017/0021318 A1 | 1/2017 | McIver et al. |
| 2017/0022788 A1 | 1/2017 | Oehring et al. |
| 2017/0022807 A1 | 1/2017 | Dursun |
| 2017/0028368 A1 | 2/2017 | Oehring et al. |
| 2017/0030177 A1 | 2/2017 | Oehring |
| 2017/0030178 A1 | 2/2017 | Oehring et al. |
| 2017/0036178 A1 | 2/2017 | Coli et al. |
| 2017/0036872 A1 | 2/2017 | Wallace |
| 2017/0037717 A1 | 2/2017 | Oehring |
| 2017/0037718 A1 | 2/2017 | Coli et al. |
| 2017/0043280 A1 | 2/2017 | Vankouwenberg |
| 2017/0051732 A1 | 2/2017 | Hemandez et al. |
| 2017/0074076 A1 | 3/2017 | Joseph et al. |
| 2017/0082033 A1 | 3/2017 | Wu et al. |
| 2017/0096885 A1 | 4/2017 | Oehring |
| 2017/0104389 A1 | 4/2017 | Morris et al. |
| 2017/0114625 A1 | 4/2017 | Norris |
| 2017/0130743 A1 | 5/2017 | Anderson |
| 2017/0138171 A1 | 5/2017 | Richards et al. |
| 2017/0145918 A1 | 5/2017 | Oehring |
| 2017/0146189 A1 | 5/2017 | Herman |
| 2017/0159570 A1 | 6/2017 | Bickert |
| 2017/0159654 A1 | 6/2017 | Kendrick |
| 2017/0175516 A1 | 6/2017 | Eslinger |
| 2017/0212535 A1 | 7/2017 | Shelman et al. |
| 2017/0218727 A1 | 8/2017 | Oehring |
| 2017/0218843 A1 | 8/2017 | Oehring |
| 2017/0222409 A1 | 8/2017 | Oehring |
| 2017/0226838 A1 | 8/2017 | Ciezobka |
| 2017/0226839 A1 | 8/2017 | Broussard |
| 2017/0226842 A1 | 8/2017 | Omont et al. |
| 2017/0234250 A1 | 8/2017 | Janik |
| 2017/0241221 A1 | 8/2017 | Seshadri |
| 2017/0259227 A1 | 9/2017 | Morris et al. |
| 2017/0292513 A1 | 10/2017 | Haddad |
| 2017/0313499 A1 | 11/2017 | Hughes et al. |
| 2017/0314380 A1 | 11/2017 | Oehring |
| 2017/0314979 A1 | 11/2017 | Ye et al. |
| 2017/0328179 A1 | 11/2017 | Dykstra |
| 2017/0369258 A1 | 12/2017 | DeGaray |
| 2017/0370639 A1 | 12/2017 | Barden et al. |
| 2018/0028992 A1 | 2/2018 | Stegemoeller |
| 2018/0038216 A1 | 2/2018 | Zhang |
| 2018/0045331 A1 | 2/2018 | Lopez |
| 2018/0090914 A1 | 3/2018 | Johnson et al. |
| 2018/0156210 A1 | 6/2018 | Oehring |
| 2018/0181830 A1 | 6/2018 | Laharuka et al. |
| 2018/0183219 A1 | 6/2018 | Oehring |
| 2018/0216455 A1 | 8/2018 | Andreychuk |
| 2018/0238147 A1* | 8/2018 | Shahri ............ E21B 43/25 |
| 2018/0245428 A1 | 8/2018 | Richards |
| 2018/0258746 A1 | 9/2018 | Broussard |
| 2018/0259080 A1 | 9/2018 | Dale et al. |
| 2018/0266217 A1 | 9/2018 | Funkhauser et al. |
| 2018/0266412 A1 | 9/2018 | Stokkevag |
| 2018/0274446 A1 | 9/2018 | Oehring |
| 2018/0284817 A1 | 10/2018 | Cook et al. |
| 2018/0291713 A1* | 10/2018 | Jeanson ............ E21B 43/116 |
| 2018/0298731 A1 | 10/2018 | Bishop |

(56) References Cited

U.S. PATENT DOCUMENTS

| | | | |
|---|---|---|---|
| 2018/0312738 A1 | 11/2018 | Rutsch et al. | |
| 2018/0320483 A1 | 11/2018 | Zhang | |
| 2018/0343125 A1 | 11/2018 | Clish | |
| 2018/0363437 A1 | 12/2018 | Coli | |
| 2019/0003329 A1 | 1/2019 | Morris | |
| 2019/0010793 A1 | 1/2019 | Hinderliter | |
| 2019/0063309 A1 | 2/2019 | Davis | |
| 2019/0100989 A1 | 4/2019 | Stewart | |
| 2019/0112910 A1 | 4/2019 | Oehring | |
| 2019/0119096 A1* | 4/2019 | Haile | B67D 7/303 |
| 2019/0120024 A1 | 4/2019 | Oehring | |
| 2019/0128080 A1 | 5/2019 | Ross | |
| 2019/0154020 A1 | 5/2019 | Glass | |
| 2019/0162061 A1* | 5/2019 | Stephenson | F04B 17/03 |
| 2019/0169971 A1 | 6/2019 | Oehring | |
| 2019/0178057 A1 | 6/2019 | Hunter | |
| 2019/0178235 A1* | 6/2019 | Coskrey | F04D 13/02 |
| 2019/0203567 A1 | 7/2019 | Ross | |
| 2019/0203572 A1 | 7/2019 | Morris | |
| 2019/0211661 A1 | 7/2019 | Reckels | |
| 2019/0226317 A1 | 7/2019 | Payne | |
| 2019/0245348 A1 | 8/2019 | Hinderliter | |
| 2019/0249527 A1 | 8/2019 | Kraynek | |
| 2019/0292866 A1 | 9/2019 | Ross | |
| 2019/0292891 A1 | 9/2019 | Kajaria | |
| 2019/0316447 A1 | 10/2019 | Oehring | |
| 2020/0047141 A1 | 2/2020 | Oehring et al. | |
| 2020/0088152 A1 | 3/2020 | Allion et al. | |
| 2020/0232454 A1* | 7/2020 | Chretien | F04B 49/065 |

FOREIGN PATENT DOCUMENTS

| | | |
|---|---|---|
| CA | 2707269 | 12/2010 |
| CA | 2482943 | 5/2011 |
| CA | 3050131 | 11/2011 |
| CA | 2955706 | 10/2012 |
| CA | 2966672 | 10/2012 |
| CA | 3000322 | 4/2013 |
| CA | 2787814 | 2/2014 |
| CA | 2833711 | 5/2014 |
| CA | 2978706 | 9/2016 |
| CA | 2944980 | 2/2017 |
| CA | 3006422 | 6/2017 |
| CA | 3018485 | 8/2017 |
| CA | 2964593 | 10/2017 |
| CA | 2849825 | 7/2018 |
| CA | 3067854 A1 | 1/2019 |
| CA | 2919649 | 2/2019 |
| CA | 2919666 | 7/2019 |
| CA | 2797081 | 9/2019 |
| CA | 2945579 | 10/2019 |
| CN | 201687513 | 12/2010 |
| CN | 101977016 | 2/2011 |
| CN | 202023547 | 11/2011 |
| CN | 102602322 | 7/2012 |
| CN | 104196613 A | 12/2014 |
| CN | 205986303 U | 2/2017 |
| CN | 108049999 A | 5/2018 |
| JP | 2004264589 | 9/2004 |
| WO | 2016/144939 | 9/2016 |
| WO | 2016/160458 | 10/2016 |
| WO | 2018044307 A1 | 3/2018 |
| WO | 2018213925 A1 | 11/2018 |

OTHER PUBLICATIONS

Notice of Allowance dated Apr. 23, 2019 in corresponding U.S. Appl. No. 15/635,028.
Schlumberger, "Jet Manual 23, Fracturing Pump Units, SPF/SPS-343, Version 1.0," Jan. 31, 2007, 68 pages.
Stewart & Stevenson, "Stimulation Systems," 2007, 20 pages.
Luis Gamboa, "Variable Frequency Drives in Oil and Gas Pumping Systems," Dec. 17, 2011, 5 pages.
"Griswold Model 811 Pumps: Installation, Operation and Maintenance Manual, ANSI Process Pump," 2010, 60 pages.
UK Power Networks—Transformers to Supply Heat to Tate Modern—from Press Releases May 16, 2013.
Non-Final Office Action issued in corresponding U.S. Appl. No. 15/293,681 dated Feb. 16, 2017.
Non-Final Office Action issued in corresponding U.S. Appl. No. 15/294,349 dated Mar. 14, 2017.
Final Office Action issued in corresponding U.S. Appl. No. 15/145,491 dated Jan. 20, 2017.
Non-Final Office Action issued in corresponding U.S. Appl. No. 15/145,443 dated Feb. 7, 2017.
Notice of Allowance issued in corresponding U.S. Appl. No. 15/217,040 dated Mar. 28, 2017.
Notice of Allowance issued in corresponding U.S. Appl. No. 14/622,532 dated Mar. 27, 2017.
Non-Final Office Action issued in corresponding U.S. Appl. No. 15/291,842 dated Jan. 6, 2017.
Final Office Action issued in corresponding U.S. Appl. No. 14/622,532 dated Dec. 7, 2016.
Non-Final Office Action issued in corresponding U.S. Appl. No. 14/622,532 dated May 17, 2016.
Final Office Action issued in corresponding U.S. Appl. No. 14/622,532 dated Dec. 21, 2015.
Non-Final Office Action issued in corresponding U.S. Appl. No. 14/622,532 dated Aug. 5, 2015.
Non-Final Office Action issued in corresponding U.S. Appl. No. 15/145,491 dated Sep. 12, 2016.
Non-Final Office Action issued in corresponding U.S. Appl. No. 15/217,040 dated Nov. 29, 2016.
Non-Final Office Action issued in corresponding U.S. Appl. No. 15/235,788 dated Dec. 14, 2016.
Non-Final Office Action issued in corresponding U.S. Appl. No. 15/145,491 dated May 15, 2017.
Non-Final Office Action issued in corresponding U.S. Appl. No. 15/486,970 dated Jun. 22, 2017.
Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.
Final Office Action issued in corresponding U.S. Appl. No. 15/294,349 dated Jul. 6, 2017.
Non-Final Office Action issued in corresponding U.S. Appl. No. 14/884,363 dated Sep. 5, 2017.
Final Office Action issued in corresponding U.S. Appl. No. 15/145,491 dated Sep. 6, 2017.
Non-Final Office Action issued in corresponding U.S. Appl. No. 14/881,535 dated Oct. 6, 2017.
Non-Final Office Action issued in corresponding U.S. Appl. No. 15/145,414 dated Nov. 29, 2017.
Non-Final Office Action issued in corresponding U.S. Appl. No. 15/644,487 dated Nov. 13, 2017.
Canadian Office Action dated Mar. 2, 2018 in related Canadian Patent Application No. 2,833,711.
Office Action dated Apr. 10, 2018 in related U.S. Appl. No. 15/294,349.
Office Action dated Apr. 2, 2018 in related U.S. Appl. No. 15/183,387.
Office Action dated May 29, 2018 in related U.S. Appl. No. 15/235,716.
Candian Office Action dated Apr. 18, 2018 in related Canadian Patent Application No. 2,928,711.
Canadian Office Action dated Jun. 22, 2018 in related Canadian Patent Application No. 2,886,697.
Office Action dated Jul. 25, 2018 in related U.S. Appl. No. 15/644,487.
Office Action dated Oct. 4, 2018 in related U.S. Appl. No. 15/217,081.
International Search Report and Written Opinion dated Sep. 19, 2018 in related PCT Patent Application No. PCT/US2018/040683.
Canadian Office Action dated Sep. 28, 2018 in related Canadian Patent Application No. 2,945,281.
Office Action dated Dec. 12, 2018 in related U.S. Appl. No. 16/160,708.
International Search Report and Written Opinion dated Jan. 2, 2019 in related PCT Patent Application No. PCT/US18/54542.

(56) References Cited

OTHER PUBLICATIONS

International Search Report and Written Opinion dated Jan. 2, 2019 in related PCT Patent Application No. PCT/US18/54548.
International Search Report and Written Opinion dated Dec. 31, 2018 in related PCT Patent Application No. PCT/US18/55913.
International Search Report and Written Opinion dated Jan. 4, 2019 in related PCT Patent Application No. PCT/US18/57539.
Non-Final Office Action dated Feb. 12, 2019 in related U.S. Appl. No. 16/170,695.
International Search Report and Written Opinion dated Feb. 15, 2019 in related PCT Patent Application No. PCT/US18/63977.
International Search Report and Written Opinion dated Mar. 5, 2019 in related PCT Patent Application No. PCT/US18/63970.
Non-Final Office Action dated Feb. 25, 2019 in related U.S. Appl. No. 16/210,749.
Non-Final Office Action dated Mar. 6, 2019 in related U.S. Appl. No. 15/183,387.
Office Action dated Jan. 30, 2019 in related Canadian Patent Application No. 2,936,997.
Office Action dated Mar. 1, 2019 in related Canadian Patent Application No. 2,943,275.
International Search Report and Written Opinion dated Jul. 9, 2019 in corresponding PCT Application No. PCT/US2019/027584.
Office Action dated Jun. 11, 2019 in corresponding U.S. Appl. No. 16/210,749.
Office Action dated May 10, 2019 in corresponding U.S. Appl. No. 16/268,030.
Canadian Office Action dated May 30, 2019 in corresponding CA Application No. 2,833,711.
Canadian Office Action dated Jun. 20, 2019 in corresponding CA Application No. 2,964,597.
Office Action dated Jun. 7, 2019 in corresponding U.S. Appl. No. 16/268,030.
International Search Report and Written Opinion dated Sep. 11, 2019 in related PCT Application No. PCT/US2019/037493.
Office Action dated Aug. 19, 2019 in related U.S. Appl. No. 15/356,436.
Office Action dated Oct. 2, 2019 in related U.S. Appl. No. 16/152,732.
Office Action dated Sep. 11, 2019 in related U.S. Appl. No. 16/268,030.
Canadian Office Action dated Oct. 1, 2019 in related Canadian Patent Application No. 2,936,997.
Office Action dated Sep. 3, 2019 in related U.S. Appl. No. 15/994,772.
Office Action dated Sep. 20, 2019 in related U.S. Appl. No. 16/443,273.
International Search Report and Written Opinion dated Jan. 2, 2020 in related PCT Application No. PCT/US19/55325.
Notice of Allowance dated Jan. 9, 2020 in related U.S. Appl. No. 16/570,331.
Non-Final Office Action dated Dec. 23, 2019 in related U.S. Appl. No. 16/597,008.
Non-Final Office Action dated Jan. 10, 2020 in related U.S. Appl. No. 16/597,014.
Non-Final Office Action dated Dec. 6, 2019 in related U.S. Appl. No. 16/564,186.
International Search Report and Written Opinion dated Nov. 26, 2019 in related PCT Application No. PCT/US19/51018.
International Search Report and Written Opinion dated Feb. 11, 2020 in related PCT Application No. PCT/US2019/055323.
Non-Final Office Action issued in U.S. Appl. No. 14/881,535 dated May 20, 2020.
Non-Final Office Action issued in U.S. Appl. No. 15/145,443 dated May 8, 2020.
Non-Final Office Action issued in U.S. Appl. No. 16/458,696 dated May 22, 2020.
International Search Report and Written Opinion issued in PCT/US2020/023809 dated Jun. 2, 2020.
Karin, "Duel Fuel Diesel Engines," (2015), Taylor & Francis, pp. 62-63, Retrieved from https://app.knovel.com/hotlink/toc/id:kpDFDE0001/dual-fueal-diesel-engines/duel-fuel-diesel-engines (Year 2015).
Goodwin, "High-voltage auxilliary switchgear for power stations," Power Engineering Journal, 1989, 10 pg. (Year 1989).
Non-Final Office Action dated Mar. 3, 2020 in U.S. Appl. No. 16/152,695.
Final Office Action dated Mar. 31, 2020 in U.S. Appl. No. 15/336,436.
Non-Final Office dated Oct. 26, 2020 in U.S. Appl. No. 15/356,436.
Non-Final Office dated Oct. 5, 2020 in U.S. Appl. No. 16/443,273.
Non-Final Office Action dated Sep. 29, 2020 in U.S. Appl. No. 16/943,727.
Non-Final Office Action dated Sep. 2, 2020 in U.S. Appl. No. 16/356,263.
Non-Final Office Action dated Aug. 31, 2020 in U.S. Appl. No. 16/167,083.
Albone, "Mobile Compressor Stations for Natural Gas Transmission Service," ASME 67-GT-33, Turbo Expo, Power for Land, Sea and Air, vol. 79887, p. 1-10, 1967.
Canadian Office Action dated Sep. 22, 2020 in Canadian Application No. 2,982,974.
International Search Report and Written Opinion dated Sep. 3, 2020 in PCT/US2020/36932.
"Process Burner" (https://www.cebasrt.com/productsloii-gaslprocessbumer) Sep. 6, 2018 (Sep. 6, 2018), entire document, especially para (Burners for refinery Heaters].
Water and Glycol Heating Systems• (https://www.heat-inc.com/wg-series-water-glycol-systems/) Jun. 18, 2018 (Jun. 18, 2018), entire document, especially WG Series Water Glycol Systems.
"Heat Exchanger" (https://en.wikipedia.org/w/index.php?title=Heat_exchanger&oldid=89300146) Dec. 18, 2019 Apr. 2019 (Apr. 18, 2019), entire document, especially para (0001].
Canadian Office Action dated Sep. 8, 2020 in Canadian Patent Application No. 2,928,707.
Canadian Office Action dated Aug. 31, 2020 in Canadian Patent Application No. 2,944,980.
International Search Report and Written Opinion dated Aug. 28, 2020 in PCT/US20/23821.
International Search Report and Written Opinion dated Jun. 2, 2020 in corresponding PCT Application No. PCT/US20/23809.
International Search Report and Written Opinion dated Jun. 23, 2020 in corresponding PCT Application No. PCT/US20/23912.
International Search Report and Written Opinion dated Jul. 22, 2020 in corresponding PCT Application No. PCT/US20/00017.
Canadian Office Action dated Aug. 17, 2020 in related CA Patent Application No. 2,944,968.
Office Action dated Jun. 29, 2020 in related U.S. Appl. No. 16/404,283.
Office Action dated Jun. 29, 2020 in related U.S. Appl. No. 16/728,359.
Office Action dated Jun. 22, 2020 in related U.S. Appl. No. 16/377,861.
Canadian Office Action dated Aug. 18, 2020 in related CA Patent Application No. 2,933,444.
Morris et al., U.S. Appl. No. 62/526,869; Hydration-Blender Transport and Electric Power Distribution for Fracturing Operation; Jun. 28, 2018; USPTO; see entire document.
Final Office Action dated Feb. 4, 2021 in U.S. Appl. No. 16/597,014.
International Search Report and Written Opinion dated Feb. 4, 2021 in PCT/US20/59834.
International Search Report and Written Opinion dated Feb. 2, 2021 in PCT/US20/58906.
International Search Report and Written Opinion dated Feb. 3, 2021 in PCT/US20/58899.
Non-Final Office Action dated Jan. 29, 2021 in U.S. Appl. No. 16/564,185.
Final Office Action dated Jan. 21, 2021 in U.S. Appl. No. 16/458,696.
Final Office Action dated Jan. 11, 2021 in U.S. Appl. No. 16/404,283.
Non-Final Office Action dated Jan. 4, 2021 in U.S. Appl. No. 16/522,043.

(56) References Cited

OTHER PUBLICATIONS

International Search Report and Written Opinion dated Dec. 14, 2020 in PCT/US2020/53980.

\* cited by examiner

HYBRID HYDRAULIC FRACTURING FLEET

RELATED APPLICATION

The present disclosure is related to U.S. Provisional Application 62/658,257, titled HIGH HYDRAULIC HORSE POWER ELECTRIC HYDRAULIC FRACTURING FLEET, filed on Apr. 16, 2018, the entirety of the disclosure of which is incorporated by reference herein.

BACKGROUND

1. Field of Invention

The present disclosure generally relates to equipment used in the hydrocarbon industry, and in particular, to a system for use in oil and gas hydraulic fracturing operations.

2. Related Technology

Historically hydraulic fracturing fleets have consisted of blenders, hydration, chemical additive, datavan, sand equipment, and hydraulic fracturing pumps that are all diesel powered. More recently, electric powered equipment has been introduced. Differing types of equipment may be found co-existing at the same wellsite. Accordingly, different types of equipment are expected to operate and function well together.

SUMMARY

The system of the present technology allows for diesel engine equipment and electric motor equipment to operate and function together. For example, each piece of equipment can typically be categorized as either electric or diesel powered. When the equipment is electric, then it receives electricity from a power source, such as a generator or a power grid. There may be one or more power sources running in parallel or running in separate micro-grids. This supports a redundant and interchangeable architecture for a hybrid fracturing fleet of the present disclosure. Moreover, if needed, such as in the case of a failure, a piece of electric equipment can be removed and a diesel unit of the same function can be replaced quickly. Such a replacement operation may occur, for example, in an emergency if no other suitable electric equipment is available.

In addition, there are often multiple hydraulic fracturing pumps located at a wellsite, such as 16-24 or more units. These hydraulic fracturing pumps can all be electric, all be diesel, or be comprised of a mixture of diesel and electric pumps. The ability to mix electric and diesel pumps at a site allows for a fleet to be much more versatile in addressing different jobs that require different numbers of pumps. In such a setup, additional hydraulic horsepower can be added or taken away very quickly and easily.

BRIEF DESCRIPTION OF THE DRAWINGS

Some of the features and benefits of the present invention having been stated, others will become apparent as the description proceeds when taken in conjunction with the accompanying drawings, in which.

Figure 1:
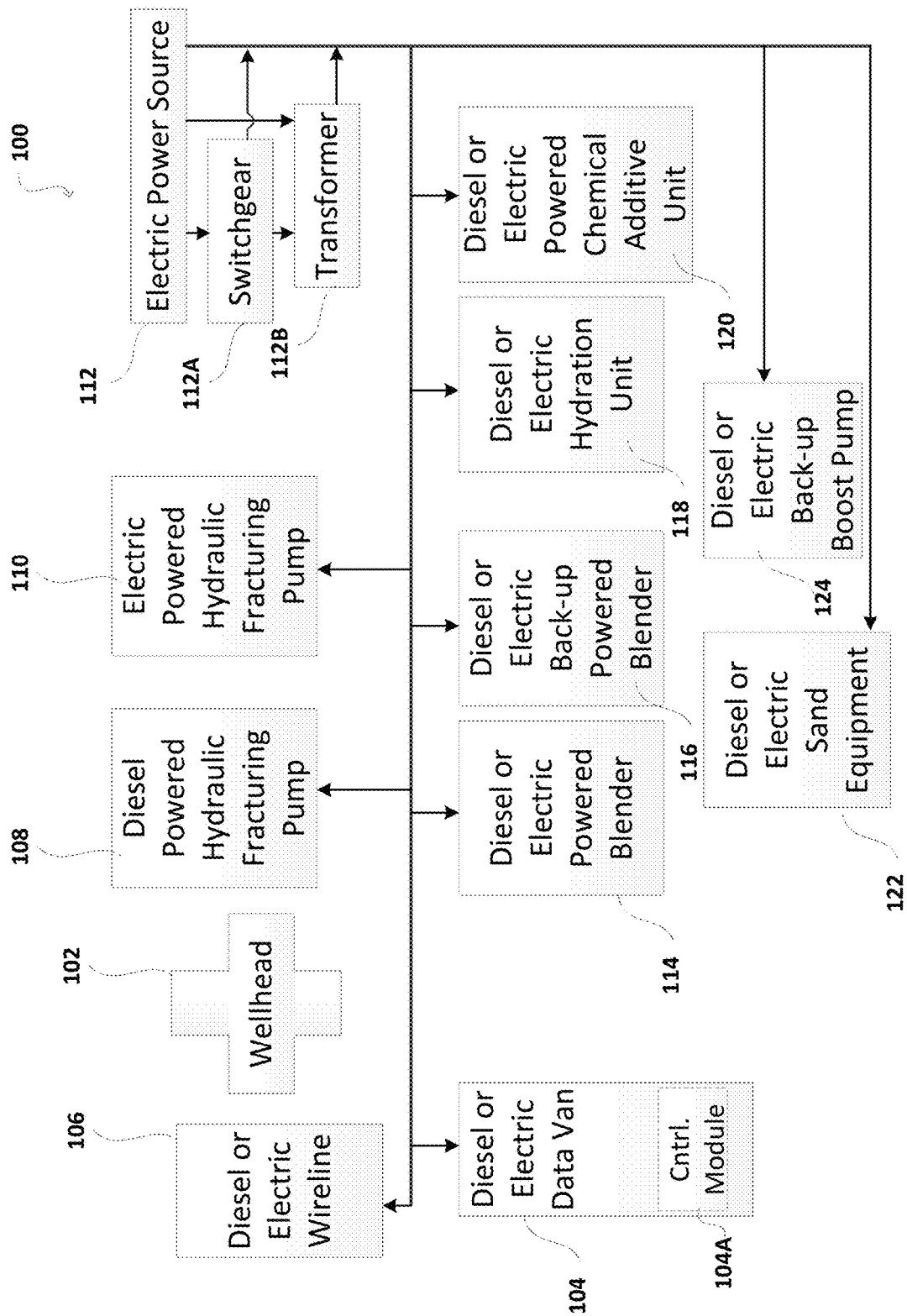
FIG. 1 is an example block schematic of a hybrid fracturing fleet in accordance with embodiments of the present disclosure.

While the invention will be described in connection with the preferred embodiments, it will be understood that it is not intended to limit the invention to that embodiment. Instead, the preferred embodiments are intended to cover all alternatives, modifications, and equivalents, as may be included within the spirit and scope of the invention as defined by the appended claims

DETAILED DESCRIPTION OF THE DISCLOSURE

So that the manner in which the features and advantages of the embodiments of hydraulic fracturing system and associated methods, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

While diesel fleets and electrical fleets may operate separately, the capability to integrate these fleets is limited. Software capable of operating multiple electric fracturing pumps may not be able to operate diesel and electric fracturing equipment together using the existing human-machine or graphical user interfaces (HMI/GUI). A multi-pump control station provided within the datavan and the capability control, via a controller in the datavan, switching components of a switchgear associated with both—electrical and diesel components enable an integration, in accordance with an embodiment. The present hydraulic fracturing fleet can, therefore, operate any connected equipment that will allow fracturing fleets to reduce manpower, save space in the datavan, and optimize pump rate coordination while making data logging simpler.

The multi-pump control station, via the controller executing a software module, is capable of using certain parameters as common and/or distinguishing parameters for electrical and diesel connected equipment. Such parameters may include: maximum desired aggregate pump rate; maximum desired wellhead fluid pressure; maximum individual pump rate; maximum individual pump pressure; desired Temperature shutdowns for motor temps, hydraulic temps, electronic enclosure temps, etc. Further, software outputs provided to the fracturing pumps, via the switchgear, may include: motor revolutions per minute (RPM); start/shutdown commands (diesel-powered equipment); enable/disable variable frequency drive (VFD-electrical-powered equipment); open/close switchgear breaker (electrical-powered equipment); and Emergency Shutdown. Using programmable logic controllers (PLCs), software inputs may be provided to the software module from fracturing pumps, including: sensor data (temperatures, pressures, valve positions, switch positions, rpms, vibration data, voltage, and amperage); alarm diagnostics; alarm conditions; and emergency shutdown. In addition, software output, such as open/close instructions, from the software module may be provided to the switchgear for control of the connected equipment. Software inputs may also be provided to the switchgear for securing or instructing: open/close status; alarms; diagnostics; voltage; amperage; and frequency. The software module may be accessible via the HMI/GUI and may provide information for and from: sensors data (temperature, pressures, valve positions, switch positions, rpms, vibration data, fluid rates); emergency shutdown status; breaker open/close status; gear (diesel-powered equipment); VFD status (electrical-powered equipment); for onboard alarms; onboard diagnostics; voltages; and amperages.

FIG. 1 is an example block schematic 100 of a hybrid fracturing fleet with interchangeable infrastructure, excluding wellhead 102, for performing hydraulic fracturing operations in accordance with embodiments of the present disclosure. In addition to the above, each piece of equipment 104-124 on a well site can be monitored and controlled from a datavan 104, which can also be located on-site. These are hybrid/interchangeable combination of components or equipment. In an example, each piece of component 104-124 may be located on one or more vehicles representing the hydraulic fracturing fleets. This is the case regardless of whether the particular piece of equipment 104-124 is electric or diesel powered. Accordingly, the datavan is adapted or configured to engage an interchangeable combination of diesel-powered components and electric-powered components in an interchangeable manner. For example, the datavan is associated with switching components in switchgear 112A for switching between the diesel-powered components and the electric-powered components upon determination by the controller of a type of a connected component (i.e., either diesel-powered or electric-powered component). The datavan is also associated with control or software module 104A executing on a controller or processor that is able to process received signals to monitor and provide instructions relating to switching requirements between the electrical and diesel components, which instructions may be then enforced by the switching components of the switchgear 112A.

For example, if an electric pump 110 were to fail (e.g., due to a tripped breaker, leaking valve, cooling issues, etc.), pump control software of the control module 104A can detect this due to digitalized inputs provided to the software from a module monitoring the pump's performance. The monitoring may be also performed by the switch gear using a relay that informs the control module 104A that it had to trip the breaker. Alternatively, the pump 108 may include a programmable logic controller (PLC) indicating a shutdown is in effect due to high temperatures, or indicating that a shutdown was initiated by an onsite sensor that detected excessive vibrations in the fluid pump. A person of ordinary skill reading the present disclosure would recognize its applicability to many other reasons that may cause the shutdown, and would be able to use the embodiments herein to address the other reasons based at least in part of many sensors other than the excessive vibration sensors. Components 104-124 may also include corresponding PLCs for providing information to a controller executing the control module (including the pump control software). The control module 104A, by its pump control software, may then safely shutdown and lockout the pump using specific digitalized instructions, and may automatically instruct, by similar digitalized commands, such as a start-up command, the starting of a standby fracturing pump. The digitalized signals may be converted to analog using a digital to analog converter and may be used to control connected components via the switchgear. The control module 104A may be configured to display sensor information and controls to the pump control operator. Further, the present disclosure supports using automation between the control module 104A and the switchgear 112A to initiate a fracturing pump to pick up lost fluid rate from a pump that failed, for instance, without further intervention, so that an aggregate of the fleet-wide fluid rate remains substantially as it was before the pump failed.

The switching components in switchgear 112A may be transfer-switching components that are configured to collaborate with the control module 104A in the datavan for switching between components depending on a monitored signal—that the component is failed or became inactive, for instance. In a further example, if a component is not drawing a steady current or is not on a steady voltage, a determination in the control module 104A is that the component is improperly functioning and a back-up component or an electric or diesel alternative may be brought on board. The switching components may include a relay associated with the switchgear 112A. The relay may include a monitor that determines a connected load. The connected load may include voltage, current, and frequency information, and may additionally monitor for anomalies. An anomaly monitored by the control module 104A may cause a breaker associated with the switching components to open indicating the abnormality. In an example, the relay is also configured to inform the datavan 104 that an electric unit 104-124 has failed and is also configured to signal a standby diesel or electric unit (e.g., back-ups 114, 124) to take its place in the control equipment residing with the datavan 104.

In an example, information from connected sub-components within equipment or connected components 104-124 may be sufficient to determine if a connected component is diesel-powered or electric-powered. For example, a sub-component may be a processor unit, such as a programmable logic controller (PLC), within each of the connected components that may communicate information about the connected component to the datavan. In one instance, such information may include electrical signals—voltage or current signals, understood to a person of ordinary skill, with different ranges in each of the diesel-powered or electric-powered instances. In an example, the electrical signals are digitalized signals from the connected components that first identify itself to the datavan. The identification may be picked up by corresponding control software in the datavan. The control software is configured, as described throughout this disclosure, to parse the identification information to determine the electric or diesel capability of the connected component. Further, the identification information may also provide controls or sensor information to display to the operators in the datavan. A person of ordinary skill would also know the type of input and expected ranges for the components 104-124 described herein, and can determine how to provide high and low alarms for these expected ranges.

Further, the diesel-powered components and the electric-powered components 104-124 include at least one back-up component (e.g., reference numerals 116 and 124) that is either or both of diesel-powered and electric-powered. Wireline equipment 106, hydraulic fracturing pumps 108, 110, blenders 114, 116, hydration units 118, chemical additive unit 120, sand equipment 122, and a boost pump 124 may be made available in diesel and electric alternatives. Furthermore, both of the diesel and electric alternatives may be available for redundant (e.g., parallel) support, as previously discussed. In the redundant or parallel support, such electrical components may form a micro-grid. An electric power source 112 provides power via a switchgear 112A and transformer 112B, depending on the power demand and quantity of components used to service one or more wellheads 102. A person of ordinary skill would recognize that a single wellhead 102 is illustrated as an example, but additional wellheads may be serviced in parallel or substantially in parallel by the hybrid fracturing fleet of the present disclosure. The electric power source 112 may include an overhead powerline, diesel generator, a natural gas engine generator, or multiple generators coupled in parallel.

Figure 2:
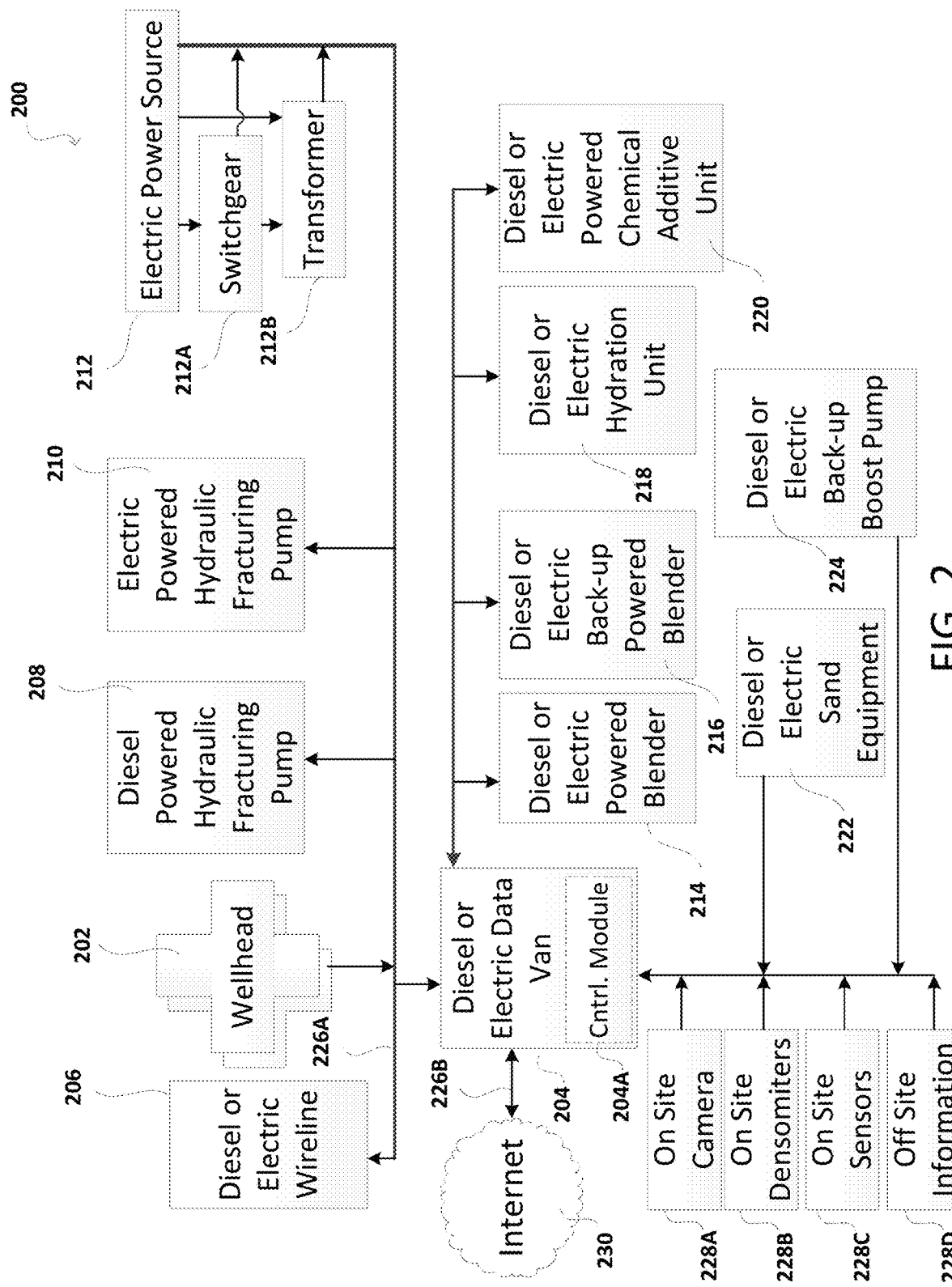
FIG. 2 is another example block schematic of a connected environment within hybrid fracturing fleets in accordance with other aspects available in the present disclosure.

FIG. 2 is an example block schematic 200 of a connected hybrid fracturing fleet, excluding wellhead 202, for powering components within the fleet, in accordance with embodiments of the present disclosure. In addition to the above example in FIG. 1, FIG. 2 illustrates that each piece of equipment 204-228A-C on a well site can be monitored and controlled from a datavan 204, located on-site, but is also connected to the internet for remote data operation. As in the case of the example in FIG. 1, each piece of component 204-228A-C, in this example, may be located on one or more vehicles representing the hydraulic fracturing fleets. Monitoring may be by on-site cameras 228A, densometers 228B, sensors 228C, and by off-site information 228D provided to instruct the controls in the datavan, for instance. This is the case regardless of whether the particular piece of equipment 204-228A-C is electric or diesel powered. Accordingly, the datavan is adapted or configured to engage a combination of diesel-powered components and electric-powered components in an interchangeable manner. For example, the datavan is associated with switching components in switchgear 112A, for switching between the diesel-powered components and the electric-powered components upon determination by the controller of a type of a connected component (i.e., either diesel-powered or electric-powered component). In an example, information from connected sub-components may be sufficient to determine if a connected component is diesel-powered or electric-powered. In one instance, such information may include electrical signals—voltage or current signals, understood to a person of ordinary skill, with different ranges in each of the diesel-powered or electric-powered instances.

The switching components of the switchgear 212A, as in the case of the example of FIG. 1, may be transfer-switching components for switching between components depending on a monitored signal in the control module 204A—that an associated component has failed or is inactive, for instance. In a further example, if the associated component is not drawing a steady current or is not on a steady voltage, a determination in the control module 204A may be that the switching component or connected equipment is improperly functioning and a back-up component or an electric or diesel alternative may be needed to compensate by being brought on board. In an example, information from connected sub-components within equipment or connected components 204-224 may be sufficient to determine if a connected component is diesel-powered or electric-powered. In one instance, such information may include electrical signals—voltage or current signals, understood to a person of ordinary skill, with different ranges in each of the diesel-powered or electric-powered instances.

While failure or inactivation of an electrical component may be by excessive load causing a tripped breaker, a diesel pump may face failure or inactivation by a change in the operative parameters, for instance. When a replacement pump is an electric pump, a pump control software of the control module 204A may inform the switchgear 212A (e.g., a relay in the switchgear) to close an associated breaker and an associated fracturing pump's PLC may enable a variable frequency drive (VFD), which operates an electrical motor. The switchgear 212A may be one or more trailers in the hybrid fracturing fleet. As such, the switchgear 212A may be a power distribution hub used for load sharing for multiple generators (e.g., power sources 112 and 212) and for distribution to multiple transformers (e.g., transformers 112B and 212B). The present disclosure also supports implementations of the switchgear used with a transformer and a VFD in the electric pump units 210. In such implementations, the switchgear is only associated with the electrical powered components.

The datavan 204, therefore, supports switching using resources of a control module 204A, which may be software in an aspect, to allow different controls and information displays for differently powered fracturing pumps. In particular, the software of the control module 204A is able to distinguish requirements of an electric pump that has no transmission gears for shifting and a diesel pump has no motor phase winding temperatures to monitor, while finding a common parameter to compensate for the change from a diesel to an electrical component. A common parameter may be the fluid displaced instead of the pump's specific ratings. Further, as different diesel pumps have different transmission gear ratios and engine RPM limits, and different electric pumps have different horse power and temperature limits, finding and utilizing the common parameter to control components from the datavan removes human intervention and improves performance of the hydraulic fracturing fleet. A person of ordinary skill reading the present disclosure would recognize its applicability to use other parameters that may contribute to a determination of an electrical versus a diesel motor, and would be able to use the embodiments herein to determine which parameters improve the determination for the connected equipment, and which parameters may be used across the connected equipment as a common parameter to make such a determination.

Further, the diesel-powered components and the electric-powered components 204-228A-C include at least one back-up component (e.g., reference numerals 216 and 224) that is either or both of diesel-powered and electric-powered. Wireline equipment 206, hydraulic fracturing pumps 208, 210, blenders 214, 216, hydration units 218, 220, sand equipment 222, and a boost pump 224 may be made available in diesel and electric alternatives. Furthermore, both of the diesel and electric alternatives may be available for redundant (e.g., parallel) support, as previously discussed. In the redundant or parallel support, the electrical components may form a micro-grid, as illustrated in the example of FIG. 1. However, a micro-grid may be also operated with a single gas turbine generator, multiple gas turbine generators, multiple diesel generators, and/or a combination of multiple gas turbine generators and diesel generators. An electric power source 212 provides power via a switchgear 212A and transformer 212B, which are both optional, depending on the amperages and voltages provided and used by the various components to service one or more wellheads 202. A person of ordinary skill would recognize that a single wellhead 202 is illustrated as an example, but additional wellheads may be serviced in parallel or substantially in parallel by the hybrid fracturing fleet of block schematic 200. As in the case of FIG. 1, the electric power source 212 of FIG. 2 may include an overhead powerline, diesel generator, a natural gas engine generator, or a combination of these sources.

FIG. 2 additionally illustrates use of internet or other data network 230 to communicate remote data between the datavan and a remote station via the internet 230. The internet 230 may be by satellite or mobile data using 3G®, 4G®, 5G®, or LTE®. A station in the datavan 204 may be available for a pump operator. Multi-pump controls are available to the pump operator to control the electric or the diesel pumps 208, 210, 224, or both the electric and the diesel pumps. Also, when communication cables or other communication channels 226B are used with the datavan 204 (for physical plug-in connectivity or wireless connectivity) and with the equipment 204-224 to communicate data, a controller in the datavan 204 can recognize the equipment 204-226 as either diesel or electric—for example, recognizing a connected pump as a diesel pump 208 or an electric pump 210 (also for boost pump 224). The physical plug-in or wireless connectivity engages the interchangeable combination of diesel-powered and electric-powered components and their back-ups so that a controller (or control equipment) may be able to gather and use data received from the components or equipment. While lines 226A are illustrated as from electric power source 212, a person of ordinary skill reading the present disclosure will understand that these lines 226A, 226B may also include data connectivity to communicate with the datavan 204 and for the datavan 204 to communicate with a remote station via internet 230.

To appropriately monitor and control different equipment 204-224, the control equipment 204A in the datavan 204 may be equipped to work with multiple different types of equipment 204-224. The control equipment 204A may be able to use the hybrid/interchangeable combination of components 204-224 by switching between the components depending on monitored signals. For example, when controlling diesel pump 208, the controls in the datavan 204 are configured with the capability to recognize input that is associated with gear and speed of an associated engine for providing the requisite control. In an example of such an operation, the control equipment 204A on the datavan 204 may be programmed to recognize that a particular diesel motor, that may be in the diesel powered hydraulic fracturing pump 208 or the other units 214-224, should be running in second gear and at a speed of 1900 revolutions per min (rpm). Appropriate adjustments may be made from the control equipment 204A of the datavan 204 if there are any changes from the expected conditions for the motor. In a similar manner, for an electric pump, the control equipment 204A of the datavan 204 is configured to recognize that there is a variable frequency drive in the electric powered hydraulic fracturing pump 210 or the other units 214-224 that requires a particular speed command, such as, for example, from about 800 to 900 rpm. The control module (and associated control equipment) 204A of the datavan 204 allows for an operator to group pumps in the equipment 204-224 together as necessary or desirable, and give joint or individual commands to the distinct motors of the equipment 204-224.

In addition to the above, one or more blenders 214, 216 may be used in communication with the datavan 204. The datavan 204, via its control equipment 204A, may be configured to recognize that the blender 214, 216 is electric or diesel powered. When multiple blenders 214, 216 are communicating with the datavan 204, and the main blender fails, a backup blender can be brought on line—either being electric or diesel. A person of ordinary skill would recognize, upon reading the present disclosure that each piece of equipment 204-224 may be present in redundant form—i.e., additional diesel pumps to back up diesel pump 208 or additional electric pumps to back up electric pump 210, and even hybrid back-ups of an electric pump for backing up a diesel pump and vice-versa. The datavan 204 can therefore accommodate control module (and associated equipment) 204A that is configured for both diesel and electric equipment 204-224 and that can switch back and forth between the two types of equipment, as needed, depending on the individual setup at the wellsite. In an example, control module 204A may include an interface that is a graphical user interface (GUI) or a human-machine interface (HMI).

Furthermore, the hybrid fracturing fleet (or block schematic) 200 may include a hydration unit 218 that may be required on site. The hydration unit 218 may be either electric or diesel powered. The control equipment 204A in the datavan 204 and the communications connections can control any type of hydration unit 218 in a similar manner to that described above for the blenders 214, 216 and the pump motors 208, 210. The same is also applicable for control of diesel and electric chemical additive units 220, chemical dry add units, sand equipment 222 and wireline and wireline cranes 206.

Figure 3:
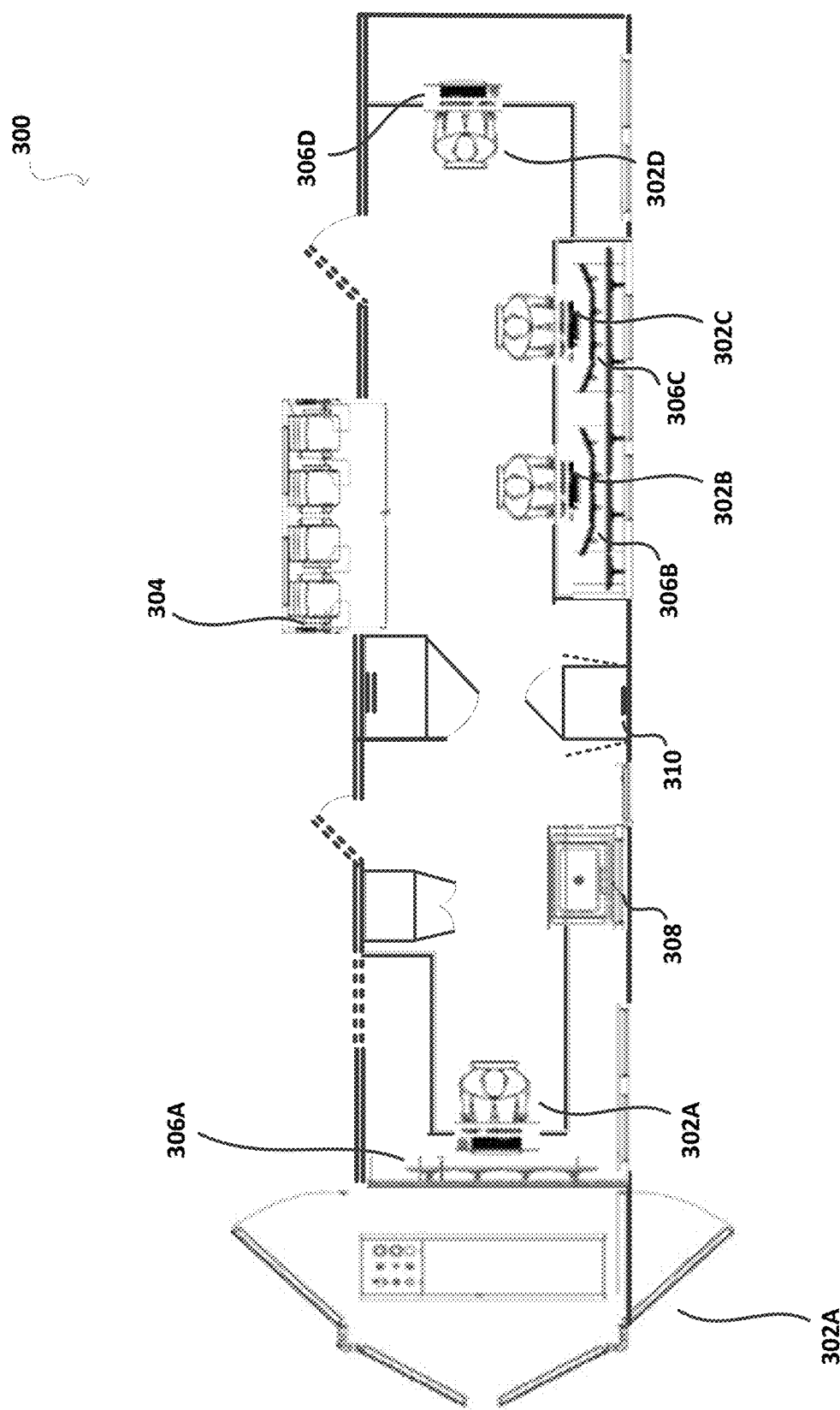
FIG. 3 is an example layout of a datavan to monitor and control within hybrid fracturing fleets in accordance with aspects of the present disclosure.
Figure 4:
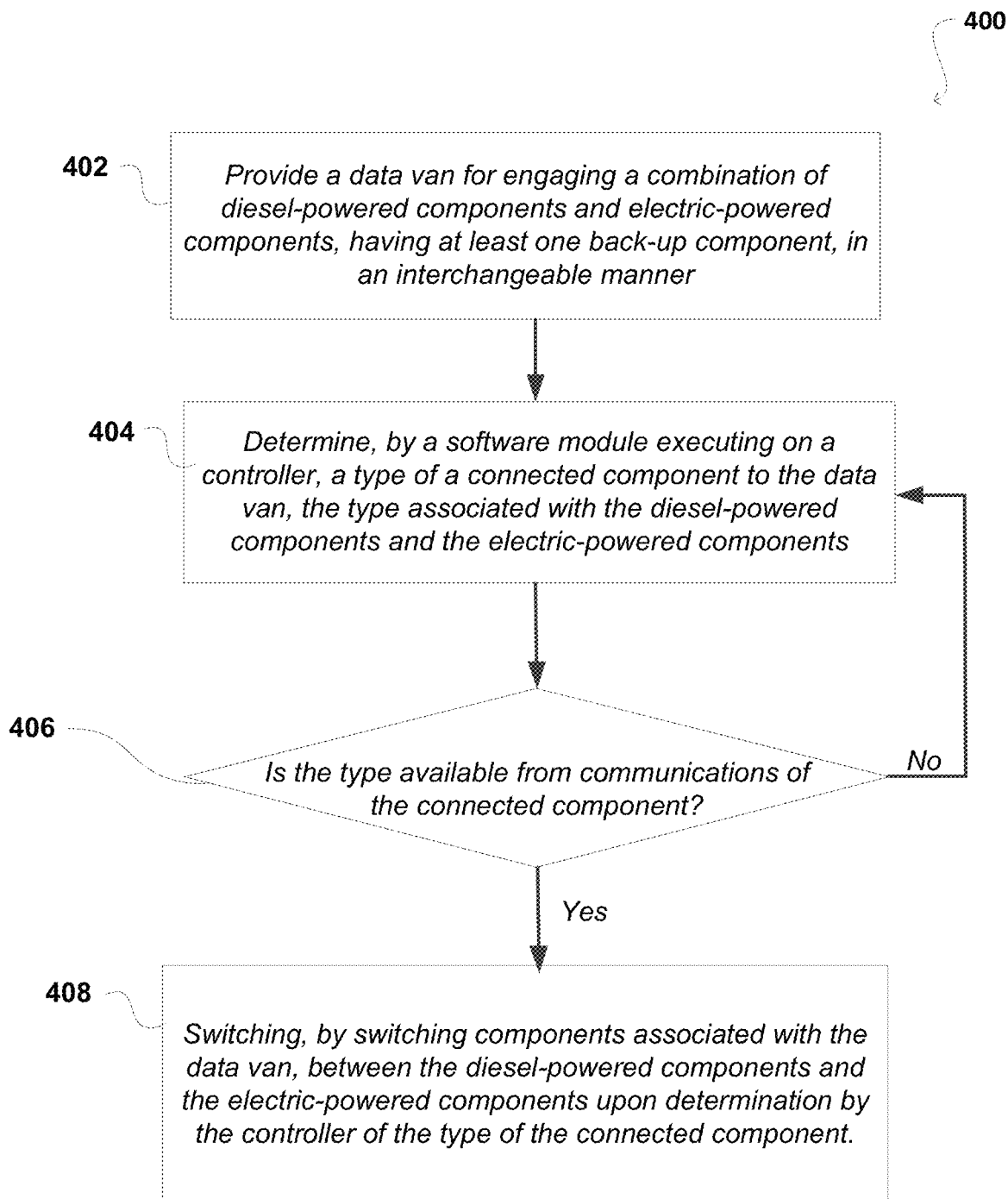
FIG. 4 is an example method of providing a datavan capable of monitoring and controlling a hybrid fracturing fleet of embodiments herein.

In some embodiments of the technology, the datavan 204 uses control equipment 204A to control diesel and electric equipment 204-224 using multiple stations including: 1) a pump operator station, which may be designated as a multi-pump hydraulic fracturing pump control station; 2) a service supervisor station, which may be used to control blender equipment 214, 216, hydration equipment 218, chemical additive equipment 220, and sand station 222; 3) a technical professional station, which may be used for data logging and quality control; 4) a pump down station, which may be used when performing zipper hydraulic fracturing operations or during wireline pump down operations happening on one well, while main pumping operations are concurrently happening on a second well; 5) customer seating; and 6) a laboratory for fluid, chemical, and proppant testing (e.g., reference numeral 304 in FIG. 3 supports both aspects (5) and (6) for customers and company works in their processes to direct operation and different service companies that are often on-site, including pressure pumping operators/operations, wireline operators/operations, flow back operators/operations, water transfer operators/operations, sand logistics operators/operations, chemical logistics operators/operations, fuel operators/operations, etc.). Each of these stations may be built with the capability to control integrated diesel and integrated electric equipment 204-224.

FIG. 3 is an example layout 300 of a datavan to monitor and control hydraulic fracturing fleets in accordance with aspects of the present disclosure. As operational area is limited, an optimal layout of a datavan is considered beneficial, as a person of ordinary skill would recognize from this disclosure, to support the additional hybrid fracturing features disclosed. The detailed view of a datavan 204 of FIG. 2, for instance, illustrates features available to configure for controlling both diesel and electric equipment with multiple stations. The datavan in the layout 300 may be powered either by electrical shore power or by a diesel generator. Shore power may be provided by a micro-grid, as in the manner disclosed in the implementations of FIGS. 1 and 2—or by a secondary external generator. For example, the datavan 300 may rely on an on-board diesel generator to provide itself power if electric shore power is not available, for instance. In addition, each individual piece of equipment 306A-D on the datavan can typically be controlled multiple different ways including: 1) centrally, from the datavan; 2) locally, on the unit 302A-D; 3) remotely, from a remote control suitcase; and/or 4) remotely, from a laptop at a remote station. The present disclosure enables application of each of the above alternate control methods from the datavan and external to the datavan. Individual equipment and operator 302A/306A may be located in a pump-down station that may concurrently operate the connected equipment with a second well. However, the present disclosure provides remote controlled functions in other locations in the datavan, such as in equipment and operator 306D/302D, which is an assigned station adjacent to a primary pump control operator.

Personnel 302A-D need not be located within the datavan. Furthermore, although the present disclosure applies towards control of diesel and of electric equipment, it is to be understood to a person of ordinary skill reading the present disclosure, that similar processes may apply to equipment powered by any source. In addition, the use of the electrical option advances a feature to safeguard equipment in the datavan in view of the optimal space adjustments. For example, server rack 310 sits adjacent to lab sink 308, and so, waterproof and dustproof covers or access doors are provided in the datavan for safeguarding the switching components of the datavan. In an example, equipment 306A-D may include the controller for determining a type of a connected component to the datavan. As previously disclosed, the type is associated with the diesel-powered components and the electric-powered components. Further, equipment 306A-D may include the control module and associated components for communicating with the switchgear for switching between the diesel-powered components and the electric-powered components upon determination by the controller of the type of the connected component. In addition, the controller and the switching components may further include multi-pump controls 306C, 306D for controlling a diesel or an electric pump in the interchangeable combination of diesel-powered components and electric-powered components.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, other the recesses can be put into arrangements other than those described, such as all being in a vertical or other arrangement. These and other similar modifications will readily suggest themselves to those skilled in the art, and are intended to be encompassed within the spirit of the present invention disclosed herein and the scope of the appended claims.

In the various embodiments of the disclosure described, a person having ordinary skill in the art will recognize that alternative arrangements of components, units, conduits, and fibers could be conceived and applied to the present invention.

The singular forms "a," "an," and "the" include plural referents, unless the context clearly dictates otherwise.

Examples of computer-readable medium used in the datavan and in the communications achieved in the present embodiments can include but are not limited to: one or more nonvolatile, hard-coded type media, such as read only memories (ROMs), CD-ROMs, and DVD-ROMs, or erasable, electrically programmable read only memories (EEPROMs); recordable type media, such as floppy disks, hard disk drives, CD-R/RWs, DVD-RAMs, DVD-R/RWs, DVD+R/RWs, flash drives, memory sticks, and other newer types of memories; and transmission type media such as digital and analog communication links. For example, such media can include operating instructions, as well as instructions related to the systems and the method steps described previously and can operate on a computer. It will be understood by those skilled in the art that such media can be at other locations instead of, or in addition to, the locations described to store computer program products, e.g., including software thereon. It will be understood by those skilled in the art that the various software modules or electronic components described previously can be implemented and maintained by electronic hardware, software, or a combination of the two, and that such embodiments are contemplated by embodiments of the present disclosure.

What is claimed is:

1. A hydraulic fracturing fleet, comprising:
  a datavan for engaging an interchangeable combination of diesel-powered components and electric-powered components, the diesel-powered components and the electric-powered components comprising at least one backup component that is diesel-powered, electric-powered, or a combination of diesel-powered and electric-powered;
  a controller executing a software module for determining a type of a connected component to the datavan by an indication provided to the software module by the connected component, the type associated with the diesel-powered components and the electric-powered components; and
  switching components associated with the datavan for communicating with the software module to receive control gear levels for a diesel engine or frequency levels for a variable frequency drive (VFD) of an electric pump, and for switching between the diesel-powered components and the electric-powered components,. upon determination by the controller of the type of the connected component.

2. The hydraulic fracturing fleet of claim 1, wherein:
  multi-pump controls in the datavan for controlling a diesel or an electric pump in the interchangeable combination of the diesel-powered components and the electric-powered components.

3. The hydraulic fracturing fleet of claim 1, further comprising:
  the switching components configured to receive engine revolutions per minute (RPM) for the diesel engine and voltage levels for the VFD, the switching components configured to control the gear levels and the frequency levels based at least in part on requirements of the hydraulic fracturing fleet.

4. The hydraulic fracturing fleet of claim 1, further comprising:
electric and diesel blenders in the interchangeable combination of the diesel-powered components and the electric-powered components, the electric and the diesel blenders associated with back-up counterpart blenders.

5. The hydraulic fracturing fleet of claim 1, further comprising:
a pump operator station comprised in the datavan for enabling operator control of the interchangeable combination of the diesel-powered components and the electric-powered components or of back-up counterpart components that are either diesel-powered or electric-powered.

6. The hydraulic fracturing fleet of claim 1, further comprising:
a pump down station configured to operate with a second well concurrently with the interchangeable combination of the diesel-powered components and the electric-powered components being in operation with a first well.

7. The hydraulic fracturing fleet of claim 1, further comprising:
a data network coupled to the datavan for transmitting on-site data associated with the hydraulic fracturing fleet to a remote station and for transmitting remote data from the remote station to the datavan.

8. The hydraulic fracturing fleet of claim 1, further comprising:
waterproof covers provided in the datavan for safeguarding the switching components of the datavan.

9. The hydraulic fracturing fleet of claim 1, further comprising:
a redundant diesel or electric power source to power the datavan from within the hydraulic fracturing fleet or from a remote station.

10. A method of operating hydraulic fracturing fleet, comprising:
engaging, using a datavan, an interchangeable combination of diesel- powered components and electric-powered components, the diesel-powered components and the electric-powered components comprising at least one back-up component that is diesel-powered, electric-powered, or a combination of diesel-powered and electric-powered;
determining, by a software module executing on a controller, a type of a connected component to the datavan by an indication provided to the software module by the connected component, the type associated with the diesel-powered components and the electric-powered components; and
switching, by switching components associated with the datavan, between the diesel-powered components and the electric-powered components upon determination by the controller of the type of the connected component, the switching components communicating with the software module to receive control gear levels for a diesel engine of the connected component or to receive frequency levels for a variable frequency drive (VFD) of an electric pump of the connected component.

11. The method of claim 10, further comprising:
controlling, by multi-pump controls in the datavan, the diesel engine or the electric pump in the interchangeable combination of the diesel-powered components and the electric-powered components.

12. The method of claim 10, further comprising:
receiving instructions for the gear levels and for an engine revolutions per minute (RPM) for the diesel engine or for the frequency levels and voltage levels for the VFD; and
controlling the gear levels the frequency levels, the RPM, or the voltage levels based at least in part on requirements of the hydraulic fracturing fleet.

13. The method of claim 10, further comprising:
providing electric and diesel blenders in the interchangeable combination of the diesel-powered components and the electric-powered components, the electric and the diesel blenders associated with back-up counterpart blenders.

14. The method of claim 10, further comprising:
enabling, from a pump operator station comprised in the datavan, operator control of the interchangeable combination of the diesel-powered components and the electric-powered components, or of back-up counterpart components that are either diesel powered or electric-powered.

15. The method of claim 10, further comprising:
operating, using a pump down station, a second well with the interchangeable combination of the diesel-powered components and the electric-powered components, the diesel-powered components and the electric-powered components being in concurrent operation with a first well.

16. The method of claim 10, further comprising:
transmitting, using a data network coupled to the datavan, on-site data associated with the hydraulic fracturing fleet to a remote station; and
transmitting remote data from the remote station to the datavan.

17. The method of claim 10, further comprising:
covering, using waterproof covers in the datavan, the switching components for safeguarding communications to the electric-powered components.

18. The method of claim 10, further comprising:
providing redundant power, from a redundant diesel or electric power source of the hydraulic fracturing fleet or a remote station, to power the datavan.

* * * * *